June 30, 1942.  P. MODIGLIANI  2,287,815
METHOD OF MAKING MAT OF GLASS FIBERS
Filed March 3, 1939
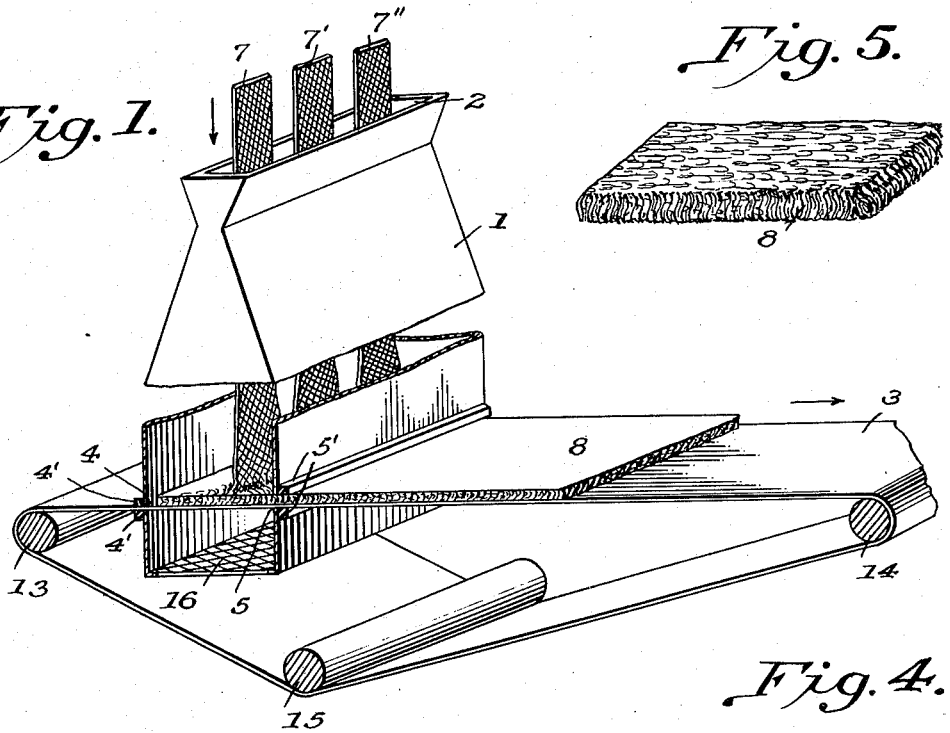
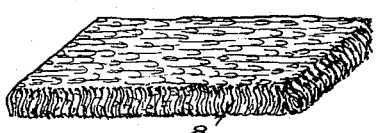
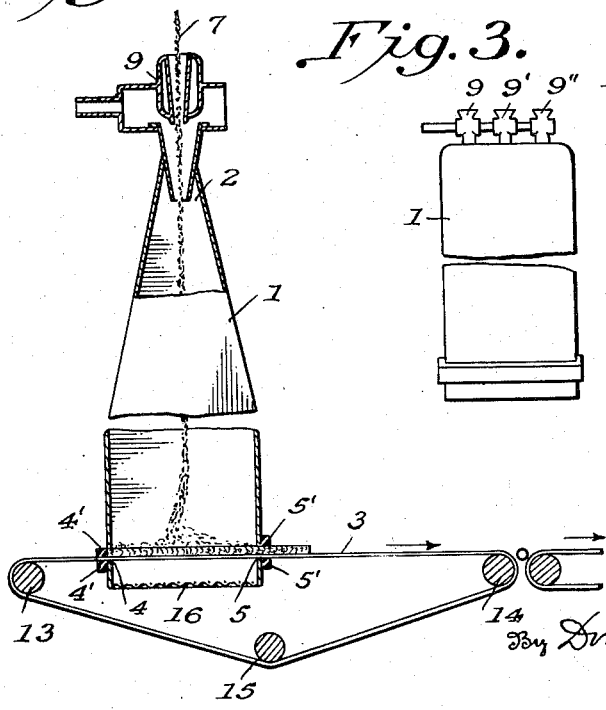
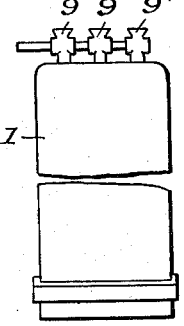
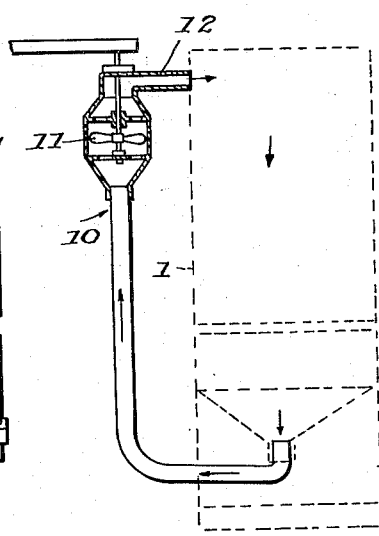
Inventor
PIERO MODIGLIANI
By Dorsey Cole & Gorman
Attorneys Patented June 30, 1942

2,287,815

UNITED STATES PATENT OFFICE 2,287,815

METHOD OF MAKING MAT OF GLASS FIBERS

Piero Modigliani, Livorno, Italy, assignor to Owens-Corning Fiberglas Corporation, Toledo, Ohio, a corporation of Delaware Application March 3, 1939, Serial No. 259,704 In Italy March 8, 1938

9 Claims. (Cl. 19—156)

The present invention relates to an insulating felt or mat composed of strips of glass thread, and the method of and apparatus for the production thereof.

Up to the present, insulating felts or mats composed of glass fiber have proven defective because they are compact and relatively dense, which density cannot be varied according to requirements, because of their formation from the elementary fibers or threads of glass by being deposited forcefully in close layers one on the other or against the other, that is, the elementary fibers lie flat upon or against each other, without forming curls or involutions. The felt or mats thus produced were therefore poorly ventilated, and also were distributed with relatively large cavities of different volume extending along the length or the width of the layers, whereby sufficient regulation of the pliancy or softness during production was impossible, particularly in the direction of depth.

According to the present invention the defects are eliminated by starting with a new product of manufacture, whereby, in producing the felt, use is made of glass fiber in the form of ribbons or strips, about 10 mm. wide for example, the desired softness being attained and regulated to a better degree during manufacture thereof by the use of ribbons or strips. The method of producing the insulating felt by the use of such ribbons or strips imparts to the felt the property of softness or pliancy evenly throughout the thickness thereof, with fine and well distributed small cavities by virtue of the structure of the strips themselves, and a graduated or controlled pliancy by means of a special method of coherently uniting the strips or ribbons with each other while they are applied to form the finished felt before and after they are caused to become mingled and interconnected.

More specifically the present method consists of beginning with ribbons or strips of different width and pliancy and in forming felt with ribbons or strips having more or less parallel fibers on a suitable surface or support, which preferably is smooth. This supporting surface may be continuous or perforate; in the latter case it is preferably a network. The depositing and supporting surface may be automatically movable and guided on rollers by an endless guide belt arrangement. The glass thread ribbons or strips may be applied by means of injectors or simply deposited through the force of gravity on the supporting surface. The preferred embodiment provides for applying the strip or ribbon on a circulating network band by means of injectors which parallels the fibers taken from a felt or mat of crossed glass threads obtained on the revolving drum in front of the furnace having alternate movement. The ribbon or strip may be formed in the manner disclosed in U. S. Patent No. 2,174,460, issued September 26, 1939, or the U. S. application of Ceretti and Modigliani, Serial No. 197,490. The direction of the nozzles of the injectors may be perpendicular or else inclined in one sense or the other with respect to the movement of the depositing surface.

In a preferred form of carrying out the method, the air passing to the injectors is taken from a closed space below the suitably perforated depositing surface, and the circulation is maintained by a blade wheel or centrifugal pump mounted at a suitable point in the circulatory passage, for example near the injectors.

In the apparatus for executing the method, the depositing surface enters and leaves hermetically, passing horizontally through a housing or chest, while one or more rows of ribbons or strips are introduced from above and are projected by means of the injectors, somewhat in the form of loops, whereby the edges of the strips or ribbons are unravelled to promote the intermingling of the finished felt. Deposition takes place with uniform frizzling and curling of the strips or ribbons. The width and other properties of the strips may be varied from the beginning in different ways. It is possible thus to graduate or control the volume of the felt for a predetermined weight between limits varying from 1 to 4 and more. The resulting air cells are closed and the air remains therein, whereby the insulating properties are improved.

Such felts may find widely different uses and are to be recommended when uniformity of production and graduation or variation of the volume for a certain weight of thread are required.

The invention is described in the following specification with reference to the accompanying drawing wherein the construction shown is given merely by way of example:

Fig. 1 is a diagrammatic perspective view of the apparatus;

Fig. 2 is a longitudinal sectional view of the apparatus of Fig. 1 in a reduced scale;

Fig. 3 shows the use of a battery of strip injectors;

Fig. 4 shows the blowing apparatus which uses air taken from below the depositing surface for blowing through the nozzles;

Fig. 5 shows the felt produced according to the new method and with the new apparatus.

Referring particularly to the figures of the drawing:

The housing 1 is traversed by the endless band 3 and is provided with the mouthpiece 2 in which different injectors are mounted. The points of entrance and exit of the circulating belt 3 are indicated at 4 and 5 and are fitted with packings of rubber or felt 4' and 5', respectively, which render tight the air content at the point of entrance and exit respectively. Three strips or ribbons 7, 7' and 7" may be introduced in as many injector nozzles to form the felt 8 from the strip deposited with pronounced involutions or curls. Three injectors 9, 9' and 9" are shown in Figure 3 for feeding the respective strips.

In Fig. 4 is shown a circulating pipe 10 in which is mounted a fan 11, a centrifugal pump, or other apparatus, which, by pressure, forces the air into the injectors, which is taken from a lower point of the housing 1 near the point at which a net 16 is provided (Fig. 1), through the circulating pipe 12 constituting the straight pipe section leading to the injector nozzles.

Three guide rollers 13, 14 and 15, may be provided for the endless belt 3, which may be suitably perforated or in the form of a net. The axis of the nozzles 9, 9', 9" may also be inclined toward or away from the direction of travel of the conveyor belt 3 to obtain different compacting effects of the fibers.

The number of strips introduced simultaneously into the housing 1 may vary, as well as the width thereof. By graduating or regulating the pressure in the injectors different effects of thickness and pliancy of the felt can be obtained.

The invention is described and illustrated by way of example only, it being understood that it may be subject to numerous modifications without departing from the scope thereof and may be applied to the handling of other artificial fibers of similar characteristics as recognized in the art.

What is claimed is:

1. The method of producing a mat which comprises depositing a plurality of strips of artificial fibers upon a surface, each strip being composed of a plurality of layers of fibers, the fibers of each layer being parallel and arranged in predetermined crossing relation with a contiguous layer of parallel fibers and commingling the deposited fibers.

2. The method of producing a mat which comprises depositing a plurality of strips of glass fibers upon a moving surface, each strip being composed of a plurality of layers of fibers, the fibers of each layer being parallel and arranged in predetermined crossing relation with a contiguous layer of parallel fibers and commingling the deposited fibers of each of the strips as well as the fibers of strips adjacent each other.

3. The method of producing an insulating mat which comprises forming a plurality of strips of artificial fibers, each strip being composed of a plurality of layers of fibers, the fibers of each layer being parallel and arranged in predetermined crossing relation with a contiguous layer of parallel fibers, depositing a plurality of said strips next to each other on an endless circulating band, and interconnecting the fibers of said strips to form a mat of substantially uniform texture.

4. The method of producing an insulating mat which comprises depositing with a forced draft, a strip of glass fibers upon a surface, each strip being composed of a plurality of layers of fibers, the fibers of each layer being parallel and arranged in predetermined crossing relation with a contiguous layer of parallel fibers, whereby a substantially uniform commingling of fibers ensues to produce a mat of uniform and regulatable texture.

5. The method of producing an insulating mat which comprises depositing with a forced draft a plurality of strips of artificial fibers upon a surface, each strip being composed of a plurality of layers of fibers, the fibers of each layer being parallel and arranged in predetermined crossing relation with a contiguous layer of parallel fibers upon a surface, whereby the forced draft arranges the individual fibers in the same general direction prior to the compacting thereof on said surface with the forced draft, with the simultaneously commingling of the fibers upon the depositions thereof on said surface.

6. The method of producing an insulating mat which comprises dropping downwardly a plurality of strips of fibers upon a moving surface with the aid of a false draft acting in the same direction and forming a part of a continuous forced circulating air circuit, each strip being composed of a plurality of layers of fibers, the fibers of each layer being parallel and arranged in predetermined crossing relation with a contiguous layer of parallel fibers, whereby an unravelling of the fibers is executed by said draft preparatory to a commingling of the fibers upon the deposition thereof of said surface.

7. The method of producing an insulating mat which comprises injecting with pneumatic force a plurality of artificial fibers next to each other upon a surface, each strip having a predetermined width and being composed of a plurality of layers of fibers, the fiber of each layer being parallel and arranged in predetermined crossing relation with a contiguous layer of parallel fibers, and agitating the fibers with said pneumatic force before and after deposition thereof, to execute a commingling thereof and the formation of a mat composed of substantially uniform convolutions.

8. The method of producing an insulating mat which comprises injecting downwardly with pneumatic force, a plurality of strips of glass fibers next to each other upon an endless band, each strip having a predetermined width and being composed of a plurality of layers of fibers, the fibers of each layer being parallel and arranged in predetermined crossing relation with a contiguous layer of parallel fibers, agitating the fibers with said pneumatic force before and after the deposition thereof to execute a commingling thereof and the formation of a mat composed of substantially uniform convolutions, and regulating the compactness of the mat by varying the pneumatic force.

9. The method of producing an insulating mat which comprises injecting downwardly with pneumatic force, a plurality of strips of glass fibers next to each other upon a moving surface in a direction having a component of feed in the plane of said moving surface, each strip being composed of a plurality of layers of fibers, the fibers of each layer being parallel and arranged in predetermined crossing relation with a contiguous layer of parallel fibers and agitating the fibers with said pneumatic force before and after the deposition thereof to execute a commingling thereof and the formation of a mat composed of substantially uniform convolutions.

PIERO MODIGLIANI.